June 7, 1966   J. C. HAMRICK   3,254,866
METHOD AND MEANS FOR SUPPORTING CONDUITS
Filed July 21, 1964   4 Sheets-Sheet 1
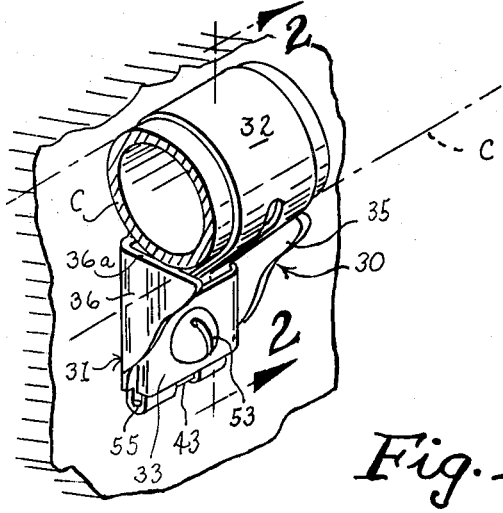
Fig. 1
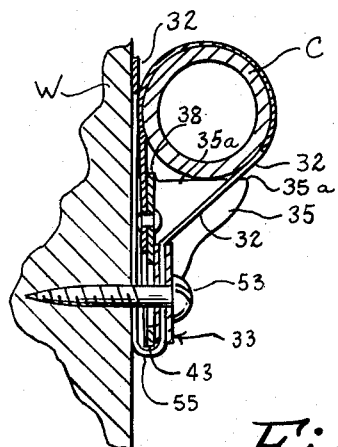
Fig. 2
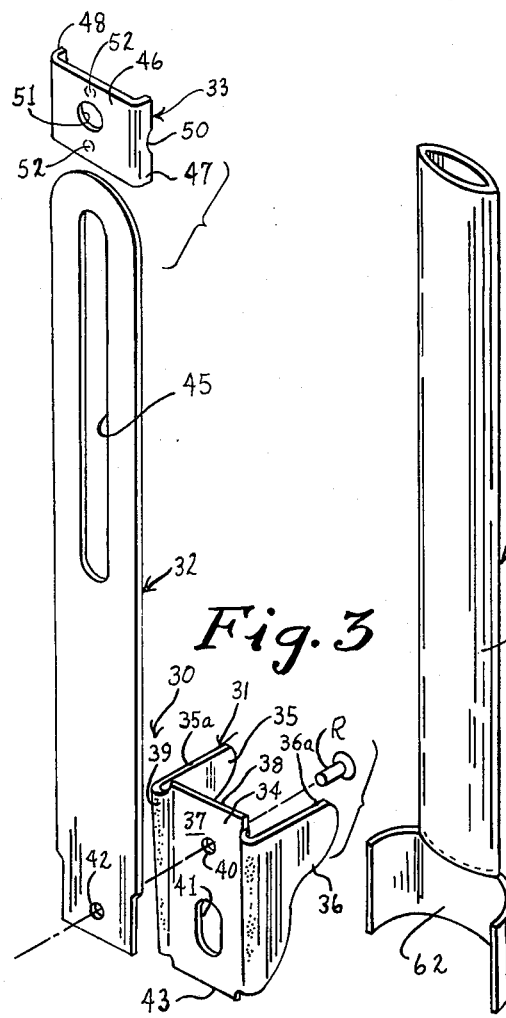
Fig. 3
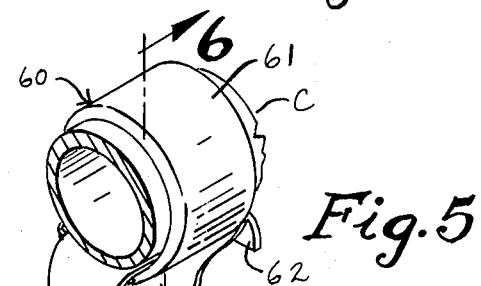
Fig. 4
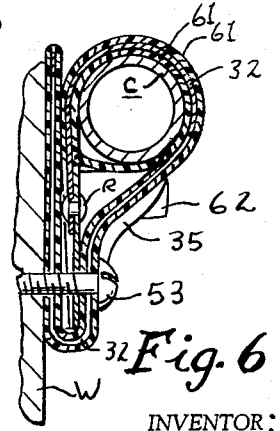
Fig. 5
Fig. 6
INVENTOR:
JAMES C. HAMRICK
BY Clifton T. Hunt Jr.
ATTORNEY

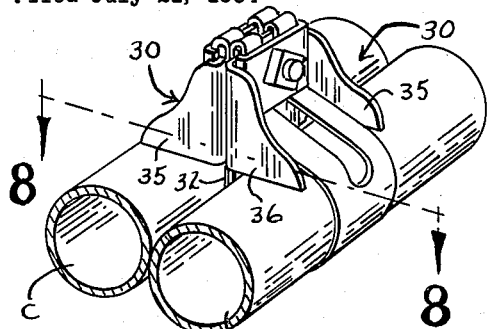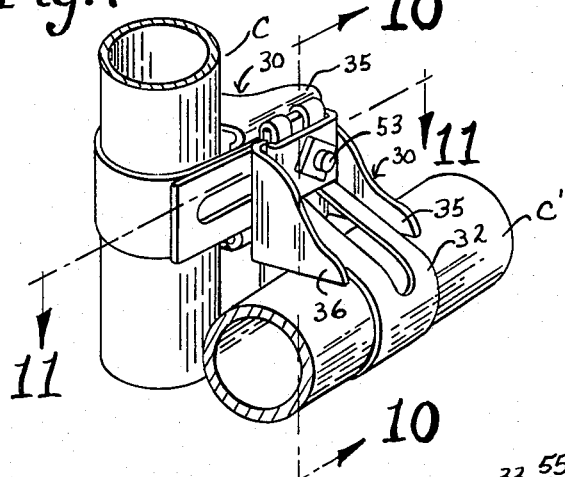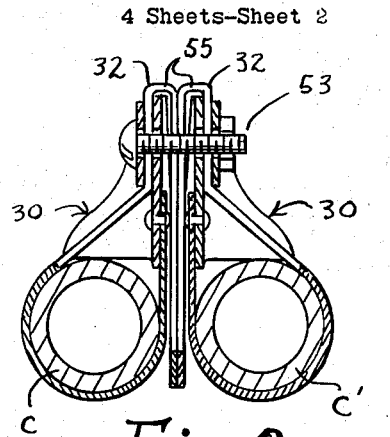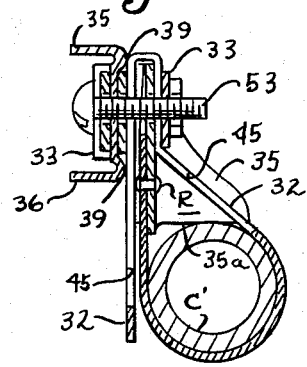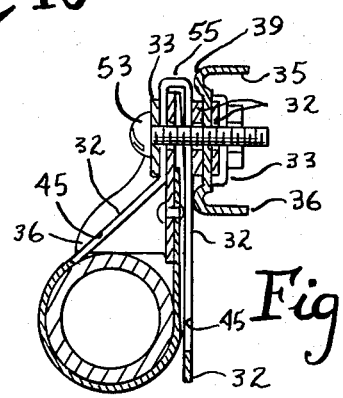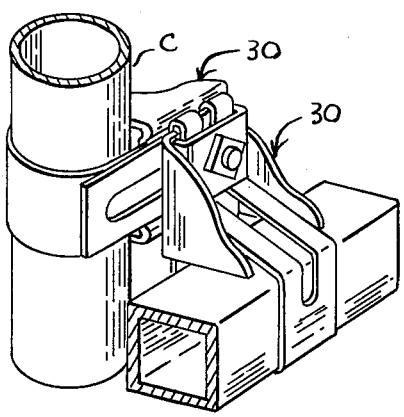

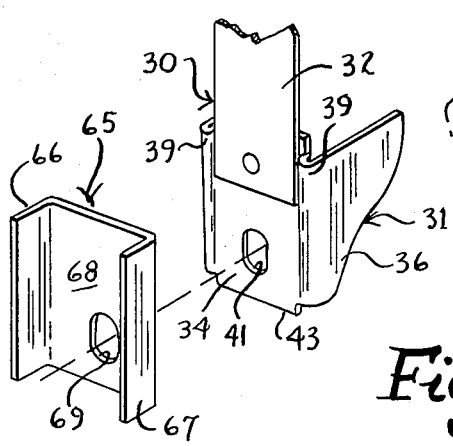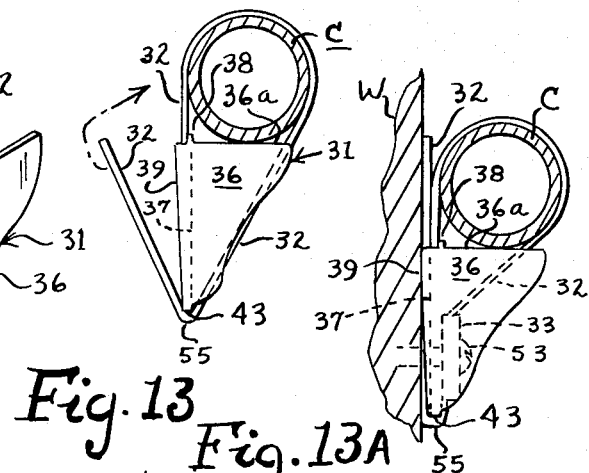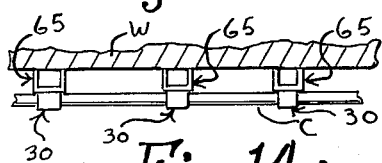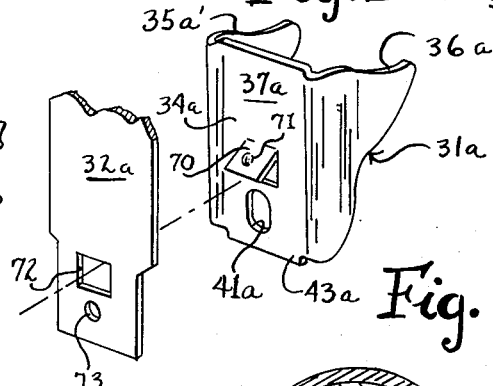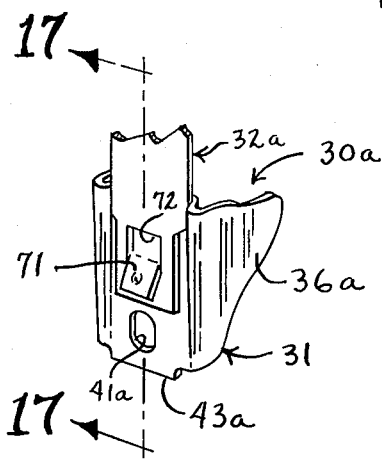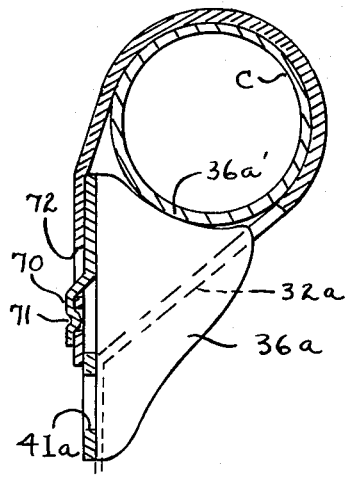

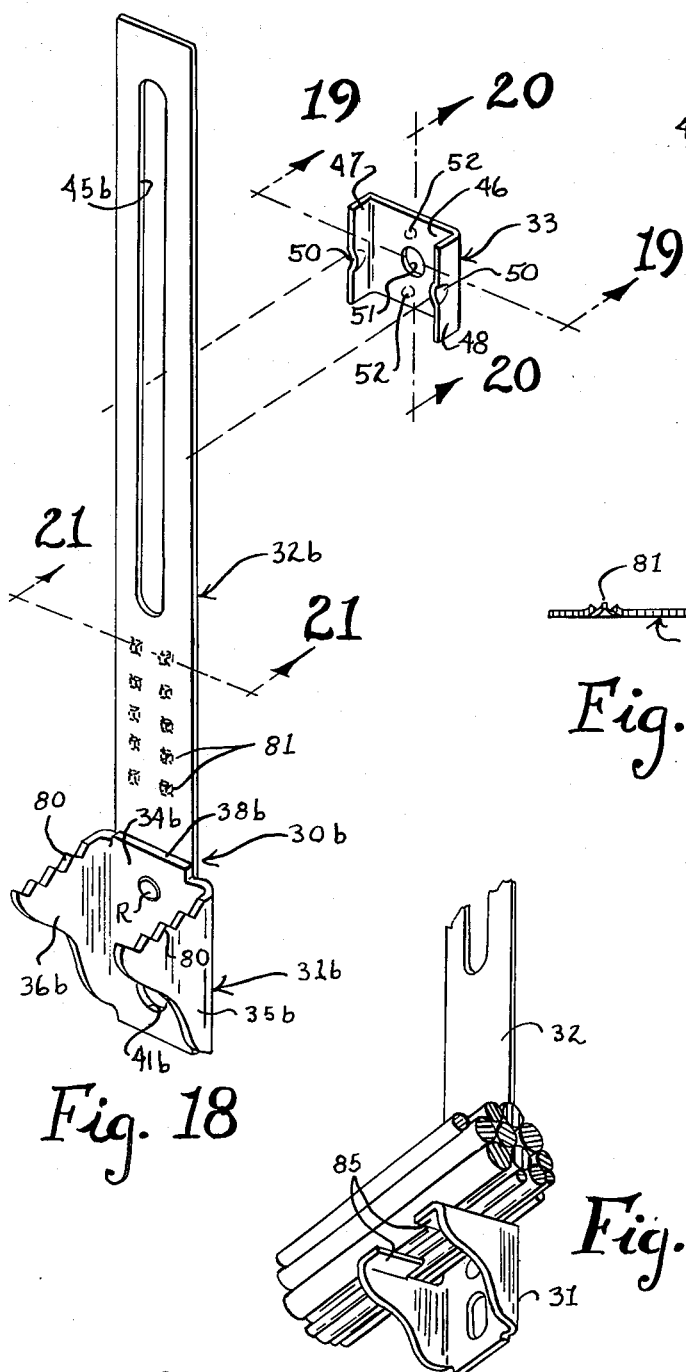
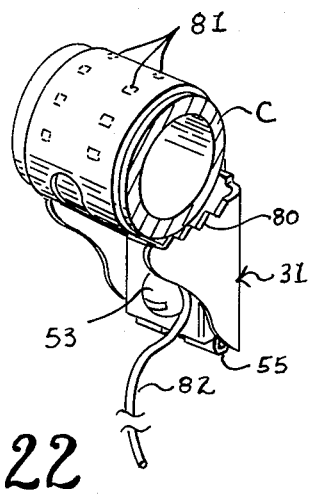

United States Patent Office 3,254,866
Patented June 7, 1966

3,254,866
METHOD AND MEANS FOR SUPPORTING CONDUITS
James C. Hamrick, Charlotte, N.C., assignor to Jet Line Products, Inc., Matthews, N.C., a corporation of North Carolina
Filed July 21, 1964, Ser. No. 384,218
19 Claims. (Cl. 248—74)

This invention relates to fastening devices and more particularly to an adjustable device for supporting and interconnecting various sizes and shapes of conduits, pipes, electrical conductors and the like. The term "conduit" as used in the title and throughout the specification and claims is intended to include all types of elongated objects, whether hollow or solid.

A number of attempts have been made to provide a fastening device which will satisfactorily support a variety of sizes and weights of conduits but despite these prior attempts, the most commonly used device for supporting conduits comprises a rigid strap with an arcuate end portion adapted to fit about a conduit and having an inside diameter corresponding to the outside diameter of the conduit. Thus, according to prevailing practice, a separate strap is needed for each size and shape of conduit.

According to the present invention, a single strap may be used to quickly and securely fasten conduits of any shape and within a generous range of sizes, such as conduits having an outside diameter of between one-quarter of an inch and one inch. Actually, there is no limit to the size conduit with which the fastener of the present invention may be used, it being only necessary to provide a flexible strap of sufficient length to extend about the circumference of the pipe and the base of the fastener.

In addition to the obvious advantages in storage and inventory resulting from the provision of a single strap for various sizes and shapes of conduit, the fastening strap of the present invention is capable of gripping the conduit about which the strap extends so tightly and with such strength as to render the device suitable for use as a connecting unit or joint for structural elements, such as scaffolding.

It is the object of this invention to provide a structure possessing all of the foregoing advantages in addition to other advantages which will occur to those skilled in the art.

Some of the objects of the invention having been stated, other objects will appear as the description proceeds, when taken in connection with the accompanying drawings, in which—

FIGURE 1 is a perspective view of the fastening device supporting a length of conduit (illustrated in section and dotted lines) against a wall or other supporting member;

FIGURE 2 is a vertical sectional view taken substantially along the line 2—2 of FIGURE 1;

FIGURE 3 is an exploded view illustrating the assembly of the component parts of the fastening device;

FIGURE 4 is a perspective view of an insulating sleeve adapted to fit over the flexible band and base of the fastening device to insulate the fastening device from the conduit;

FIGURE 5 is a view similar to FIGURE 1 but including the insulating sleeve of FIGURE 4;

FIGURE 6 is a vertical sectional view taken substantially along the line 6—6 of FIGURE 5;

FIGURE 7 is a perspective view of two fastening devices secured together to connect two parallel conduits;

FIGURE 8 is a sectional view taken substantially along the line 8—8 in FIGURE 7;

FIGURE 9 is a view similar to FIGURE 7 but showing the fastening devices and their respective conduits in perpendicular relation to each other;

FIGURE 10 is a view taken substantially along the line 10—10 in FIGURE 9;

FIGURE 11 is a view taken substantially along the line 11—11 in FIGURE 9;

FIGURE 12 is a view similar to FIGURE 9 but showing how the connecting strap of the fastening device may conform to any desired configuration such as a rectangular conduit;

FIGURES 13 and 13a are sequential elevation views of the fastening device, with the conduit in section, illustrating steps in the connecting of the device and the conduit;

FIGURE 14 is an exploded view with parts broken away, looking at the rear of the base member of the fastening device and illustrating the assembly of the base member with a spacer element;

FIGURE 14a is a plan view of a conduit secured in spaced relation to a wall utilizing the spacer element of FIGURE 14, and showing the wall in section;

FIGURE 15 is an exploded view, with parts broken away, of a modified form of the invention;

FIGURE 16 is a view similar to FIGURE 15 but showing the parts in assembled relation;

FIGURE 17 is a sectional view taken substantially along the line 17—17 in FIGURE 16 and showing the flexible strap positioned about a conduit supported by the base;

FIGURE 18 is an exploded view of another modified form of the invention and also illustrating how the bearing plate is attached to the strap in all preferred embodiments of the invention;

FIGURE 19 is a sectional view taken substantially along the line 19—19 in FIGURE 18;

FIGURE 20 is a sectional view taken substantially along the line 20—20 in FIGURE 18;

FIGURE 21 is a sectional view taken substantially along the line 21—21 in FIGURE 18;

FIGURE 22 is a perspective view showing the fastening device of FIGURE 18 positioned about a conduit to form a ground clamp; and FIGURE 23 is a perspective view looking up toward the bottom of a third modified form of the invention.

Referring more specifically to the drawings, numeral 30 broadly designates a fastening device having a base 31, a flexible strap 32, and a washer or bearing plate 33. The base member 31 is relatively rigid as compared with the flexible strap 32 and is of generally U-shaped cross-sectional configuration comprising a web 34 and support members or flanges 35 and 36 extending from opposite edges of the web 34 in spaced parallel relation to each other. The major portions of the flanges 35 and 36 project forwardly from the web 34, but junctures of the flanges 35, 36 with the web 34 define shoulders 39 which extend rearwardly slightly beyond the rear surface 37 of the web 34. Consequently, the rear surface 37 of the web 34 is channel-shaped, and this channel-shaped configuration is deeper or more pronounced adjacent the upper edge 38 of the web 34 than at its lower edge.

The web 34 is provided with bores or apertures 40, 41, the bore 40 being provided for the reception of a rivet R which may be passed through a bore 42 in strap 32 to secure the strap to the base. The aperture 41 accommodates a screw or desired fastener element 53 as will more fully appear hereinafter. The lower end of the web 34 terminates in a flange or locking member 43 which, in the preferred embodiment of the invention, projects beyond the lower edge of the support flanges 35, 36 for creasing engagement with the flexible strap 32 as an important step in attaching the fastening device to a conduit.

The strap 32 is connected to the rear surface 37 and extends from the edge 38 of web 34. The marginal edges of that portion of the flexible strap 32 adjacent the bore 42 may be more closely spaced to each other than the marginal edges of the remaining major portion of the strap 32, depending upon the relative width of the strap 32 and the base 31. It is desirable to have the marginal edges of the major portion of the strap 32 spaced apart a sufficient distance to accommodate a longitudinal slot 45 extending from adjacent the free end of the strap 32 toward the base 31. The slot 45 is registrable with bore 41 in web 34 and facilitates adjustment of the strap 32 about different sizes of conduit C.

The bearing plate 33, in its preferred form, is most clearly seen in FIGURES 18, 19 and 20, where it is illustrated as being of generally U-shaped configuration in cross section and including a web 46 to opposite edges of which are joined a pair of parallel legs 47, 48. The legs 47 and 48 are dimpled inwardly toward the center of the washer as indicated at 50. The web of the bearing plate 33 is provided with a centrally located bore 51 and a pair of inwardly directed dimples 52 spaced between the legs 47, 48.

As most clearly seen in FIGURES 3 and 18, the bearing plate 33 is adapted to be positioned about the flexible strap 32 with the bore 51 in registry with the slot 45. The bore 51 and slot 45 are provided for the reception of the bolt, screw, stud or other fastening means 53 which penetrates bore 41 in web 34 and simultaneously tightens strap 32 about conduit C and secures the fastening device 30 to a supporting member such as a wall W in FIGURE 1, or to another fastening device 30' as in FIGURES 7–12.

The dimples 50 in the legs 47, 48 of the bearing plate 46 are adapted to engage the marginal edges of the strap 32 and to thereby releasably retain the bearing plate on the strap. The dimples 52 in the web 46 of the bearing plate 33 are adapted to travel within the slot 45 in the strap 32 and to bear against the end walls which define the extremities of the slot 45, thereby limiting movement of the bearing plate 33 relative to the strap. While the specific construction of the bearing plate is desirable as providing a convenient snap-on plate, it is not essential to successful use of the invention. Any bearing plate or means which will aid in retaining the integrity of the strap under pressure of the screw 53 will be found satisfactory.

Assuming it is desired to fasten a conduit C to a wall W as illustrated in FIGURES 1 and 2, a fastening device 30 comprising a base 31 with its attached strap 32 and plate 33 is positioned about the length of conduit C in such a manner that the conduit C is supported by the upper edges 35a and 36a on the supporting flanges 35, 36 with the strap 32 extending beyond the upper edge 38 of web 34 and over the conduit C. The strap 32 is passed about the major portion of the circumference of the conduit C and across the front of the base between the flanges 35, 36 to the locking flange 43 extending from the lower portion of the base 31. The strap 32 is bent over the locking flange 43 and upon itself to define a crease or crimp as at 55 (FIGURES 13 and 13a) with the free end of the strap extending along the rear of the web between the shoulders 39 and toward the edge 38 of web 34.

The crease 55 serves to loosely connect the fastening device 31 to the conduit C, it being understood that the strap 32 is formed of a material such as sheet metal which has the inherent capacity of retaining a shape imparted to it such as the crease 55. It will be appreciated by those skilled in the art that the loosely connected fastening device may be moved longitudinally along the conduit C as desired to locate the fastening device at the exact point of desired attachment to the wall W. When this point of attachment has been reached, the free end of strap 32 is brought into overlying relation with its fixed end and with the rivet R extending into the slot 45. The free end of the strap as thus disposed in the channel-shaped rear surface of the web 34 occupies the same plane as the rearmost extremities of the shoulders 39 and presents a flat surface to the wall W. The installation is completed by passing a screw or other fastening device 53 through the opening 51 in the bearing plate 33, through the slot 45 in the strap 32 and through the aperture 41 in the base, after which screw 53 is driven into the supporting member W to simultaneously tighten the strap about the conduit and support the assembly.

As the screw is driven into the wall W, that portion of the strap 32 extending across the front surface of the web and lying between the support flanges 35, 36 is drawn tightly about the conduit C as said portion of the strap 32 is moved inwardly toward the web 34 of the base 31 under pressure of the screw 53. The crease 55 in the strap 32 adjacent the locking flange 43 tends to prevent that portion of the strap 32 in juxtaposition to the rear surface of the web from moving, with the result that that portion of the strap lying between the support flanges 35, 36 is moved from substantially the straight line position indicated by the dotted line 32 in FIGURE 13 toward web 34 to the dotted line position 32 in FIGURE 13a, the crease or crimp 55 remaining at the locking flange 43.

The bearing plate 33 makes it possible for the screw 53 to be drawn very tightly against the strap 32 because the legs 47 and 48 on the plate 33 engage the outer edges of the strap 32 and hold them against lateral displacement under pressure of the screw 53. Also, the plate 33 provides a sufficiently broad base to prevent the head of the screw 53 from laterally displacing the portions of the strap 32 adjacent the slot 45. Assuming that the strap 32 has been drawn fairly tightly about the conduit and across the flange 43 by hand before making the crease or crimp 55, there will be a minimum amount of slack in the strap 32 between its fixed ends defined by the rivet R and crimp 55 on opposite sides of the conduit C. Consequently, the strap 32 may be drawn very tightly about the conduit C as the plate 33 and adjacent portion of the strap 32 are moved toward the web 34 (FIGURE 13a). Actually, the strap may be drawn so tightly as to prevent the conduit from rotating on its longitudinal axis relative to the fastening device 30.

The substantially planar surface at the rear of the assembly is made possible by the tapered channel-shaped configuration of the rear surface 37 of the base 31 which accommodates the double thickness of strap 32 in the relatively deeper channel adjacent the upper edge 38 of the base 31 with the single thickness of the strap 32 occupying the relatively shallow channel adjacent the locking flange 43. Thus, the shoulders defined by the junctures of the supporting flanges 35, 36 with the web 34, the head of the rivet R, and the rearmost surface of the strap 32 all occupy substantially the same plane when the fastening device secures the conduit C to a wall W as illustrated in FIGURES 1 and 2. In some instances, it may be desirable to slightly extend and stipple or roughen the rearmost surface of the shoulders 39 to facilitate installation of the device on a slick surface, such as ceramic tile.

In some instances, as where it is desired to allow for subsequent expansion of the conduit, it is desirable to support conduits loosely rather than binding them tightly to the base with the strap as previously described. To make such allowance, the strap 32 is manually conformed to the major periphery of the conduit before creasing it about the flange 43. When the strap is conformed to the conduit in this manner, it extends from the conduit to the flange 43 in substantially parallel relation to the web 34 rather than in angular relation as shown in FIGURE 13. The strap 32 extends beyond the flange 43 and is creased as at 55 with the free end portion extending upwardly as in FIGURE 13, after which the fastening screw 53 will maintain the desired amount of tension in that portion of the strap which encircles the conduit.

Referring to FIGURES 4, 5 and 6 means are provided for insulating the conduit C from the fastening device 30. Preferably, said means takes the form of an insulating sleeve 60 comprising an elongated tube 61 and a flap 62 articulated to one wall of the sleeve 61 and extending in perpendicular relation thereto. The sleeve 61 is adapted to fit over the strap 32 with the flap 62 supported by the upper edges 35a and 36a of the support flanges 35, 36. Thus, the insulating member 60 as illustrated in FIGURE 4 should be turned 180°, assuming it is desired to properly position it about the assembled fastening device 30 in FIGURE 3. So arranged, the fastening device 30 with the insulating sleeve 60 thereon may be secured about a conduit or electrical conductor C in the manner previously described and as illustrated in FIGURES 5 and 6. It will be understood that the insulating sleeve 61 is punctured at a desired point to accommodate the screw 53 to permit it to be passed through the opening 41 in the web of the base 31.

As is apparent from FIGURES 2 and 6, one of the advantages of the fastening device of the present invention is that it permits the conduit or pipe to be supported against the wall or other supporting surface, rather than spaced therefrom as is the case in some prior art devices. In some instances, however, it is desirable that the pipe or conduit be supported in spaced relation from the wall. An example of such an installation is the dairy industry where it is desired to provide a continuous smooth wall surface for ease in cleaning and to prevent accumulations of dirt between the wall and the conduit such as would result if the conduit were installed in a manner illustrated in FIGURE 2.

The fastening device of the present invention is adapted to be used with a spacer 65 (FIGURES 14 and 14a). The spacer 65 may comprise a pair of parallel spaced legs 66 and 67 connected by a web 68 which is provided with a bore 69 adapted to register with the bore 41 in the web 34 of the base member 31.

After the fastening device 30 has been loosely locked about the conduit C in the manner described, the spacer 65 is positioned adjacent the rear surface of the base member 31 with the respective bores 69 and 39 in registry to accommodate the screw 53 which secures the assembly to the wall W with only the free ends of the vertically disposed legs of the spacers 65 engaging the wall (FIGURE 14a).

In addition to securing conduits snugly against or spaced a desired distance from walls or other supporting surfaces, the invention also finds utility in interlocking or connecting pipes, conduits or structural members in desired angular relation to one another. Thus, as illustrated in FIGURES 7 and 8, two parallel conduits C and C' may be held snugly together by positioning a fastening device 30 about each conduit as previously described and securing them in back-to-back relation by a bolt and nut or other suitable connector 53'.

FIGURES 9 through 12 illustrate how two of the fastening devices of the invention may be fastened together in angular relation to lock two conduits or structural members together in perpendicular relation to one another. This is accomplished in the same manner as the connection of two parallel pipes except that one of the fastening devices 30 is rotated 90° with respect to the other fastening device. The connector 53' holds the fastening devices and their respective conduits or structural members in desired position relative to one another. The planar rear surface presented by the assembled device 30 facilitates connecting two such devices in back-to-back relation as described.

As seen in FIGURE 12, the fastening device may be employed in conjunction with a rectangular conduit as well as a cylindrical conduit, and conduits or structural members of different configurations may be connected together in desired angular relation by means of the present invention.

It will be appreciated by those skilled in the art that the illustrated uses of the fastening device are exemplary only and that a plurality of fastening devices may be used to hold structural members, such as a scaffold together, in desired angular relation, thereby permitting such a structure to be quickly assembled and dis-assembled.

In FIGURES 15 through 17, a slightly modified form of the invention is disclosed wherein means are provided for releasably connecting a flexible strap 32a to the rear face 37a of the web 34a of a base member 31a. Although not limited to such a use, the construction illustrated in FIGURES 15 through 17 is particularly intended for use with pipes of relatively large diameter, such as pipes of three inches in diameter or larger. While it is not difficult to accommodate the unused portion of the flexible strap when dealing with conduits of smaller sizes, the unused portion of the flexible strap extends beyond the assembly and presents a problem when dealing with larger conduits where an attempt is made to use a single strap of a given length to accommodate several sizes of the larger pipes. For the reasons stated, it has been found desirable to provide a separate flexible strap of a desired length for each size of larger pipe of three inches in diameter or larger, or in any case where the excess length of strap is objectionable.

In order to attain certain economies in manufacture, storage and assembly, it has been found possible to standardize the base while providing different lengths of strap. The base and strap are delivered to the consumer as separate components but include means whereby the strap may be readily attached to the base. According to this form of the invention, a tab 70 having an inwardly directed nipple 71 is struck from the web 34a and a mating aperture or opening 72 is formed adjacent one end of the flexible strap 32a for reception of the tab 70 as shown in FIGURE 16. The strap 32a also has a small bore or cavity 73 therein immediately beneath the opening 72, for reception of the nipple 71 after the tab 70 has been passed through the opening 72 and bent downwardly as shown in FIGURE 17. Thus, the strap 32a may be readily but securely connected to the base member 31a by a mechanic just prior to positioning the device about a conduit.

While the substantially straight upper edge 35a and 36a (FIGURE 3) has been found satisfactory for use with conduits of smaller diameter, it has been found preferable to provide curvilineal upper edges 35a' and 36a' to more nearly conform to the curvature of the larger conduits with which the base 31a is intended to be used.

A further modification of the invention is illustrated in FIGURES 18, 21 and 22, wherein the upper edges 35a, 36a (FIGURE 3) have been serrated as at 80 to provide positive contact with a conduit or ground pipe with which the fastening device 30b is intended to be used as a ground clamp. The flexible strap 32b has also been modified by providing sharp indentations or cut-outs 81 facing inwardly from that portion of the strap adjacent the base 31b. This further insures that the ground pipe about which the fastening device or ground clamp 30b is positioned will be tightly engaged. A ground wire 82 (FIGURE 22) may be connected to the screw 53b from which it extends to any desired electrical circuit.

Referring to FIGURE 23, a further modification is provided which is in contrast to the form of the invention shown in FIGURES 18, 21 and 22 in that the serrations there shown are replaced by inwardly directed ears 85. Such a structure prevents the edges 35a and 36a in the form of invention shown in FIGURE 3 from biting into the electrical conductor or conduit carried by the fastening device. This is advantageous particularly when dealing with electrical conductors where it is not desired to rupture the insulation.

There is thus provided an improved fastening device for use with conduits, electrical conductors and structural elements which is capable of a wide variety of uses and adaptations and wherein substantial economies of manufacture may be obtained by providing a single size fastening element to accommodate a plurality of sizes and shapes of objects to be connected thereby.

In the drawings and specification there have been set forth preferred embodiments of the invention and, although specific terms are employed, they are used in a generic and descriptive sense only and not for purposes of limitation, the scope of the invention being defined in the claims.

I claim:
1. A fastening device for conduits comprising,
 (a) a base member including
  (i) a web,
  (ii) a pair of parallel support flanges carried by the web and engageable with a conduit adjacent one end of the web,
 (b) a flexible strap,
 (c) means connecting the flexible strap to said web to define a first fixed end of the strap with the strap extending from said one end of the web and adapted to extend about the conduit and the base member between the support flanges,
 (d) means on the end of the web remote from its said one end for crimping the flexible strap to define a second fixed end of the strap, and
 (e) fastening means between the fixed ends of the strap for drawing and maintaining the flexible strap tightly about the conduit.

2. A fastening device according to claim 1 wherein said last-named means simultaneously secures the assembly to a desired object.

3. A fastening device according to claim 1 wherein,
 (a) the flexible strap has a longitudinal slot in that portion of the strap adapted to extend about the web, and
 (b) the web has an opening therethrough registrable with the slot in the strap, whereby said fastening means may be passed through the slot in the strap and the opening in the web.

4. A fastening device according to claim 3 wherein said fastening means includes a bearing plate in juxtaposition to the strap and having an opening therethrough registrable with the slot in the strap and the opening in the web.

5. A fastening device according to claim 4 wherein said fastening means also includes a fastening element adapted to penetrate the openings in the bearing plate and the web and the slot in the strap and to be attached to said desired object.

6. A fastening device according to claim 4 wherein said bearing plate includes means for attaching the bearing plate to the strap for longitudinal sliding movement relative to the strap.

7. A fastening device according to claim 5 wherein the bearing plate includes means preventing lateral displacement of the longitudinal side edges of the strap under pressure of the fastening element.

8. A fastening device according to claim 2 wherein means are provided for supporting the base member in spaced relation to said desired object.

9. A fastening device according to claim 1 wherein said means connecting the strap to the web comprises:
 (a) a tab struck from the plane of the web and opening away from said one end of the web,
 (b) said strap having an aperture adjacent one of its ends through which the tab on the web is adapted to be received, and
 (c) said tab being foldable over a portion of the strap adjacent the aperture to connect the strap to the base member.

10. A fastening device according to claim 9 wherein a mating detent and seat are provided in the tab and in said portion of the strap over which the tab is foldable.

11. A fastening device according to claim 1 wherein the web includes a channel-shaped surface remote from the support flanges.

12. A fastening device according to claim 11 wherein the channel-shaped surface of the web is deeper adjacent said one end of the web than at the other end of the web.

13. A fastening device according to claim 1 wherein the conduit comprises a ground pipe and wherein the support flanges include upper edges having serrations formed therein.

14. A fastening device according to claim 13 wherein the strap has a roughened surface engageable with the ground pipe supported on the serrated upper edges of the support flanges to define a ground clamp.

15. A fastening device according to claim 1 wherein the support flanges include upper edges which project laterally for increased surface engagement with conduits carried thereby.

16. Means releasably interconnecting juxtaposed conduits comprising:
 (a) a fastening device for each conduit which includes,
  (i) a base member comprising
   (1) a web having front and rear surfaces,
   (2) a pair of support flanges projecting beyond the front surface of the web and engageable with a conduit adjacent one end of the web,
  (ii) a flexible strap,
  (iii) means connecting the strap to the web with the strap extending beyond said one end of the web, whereby the strap may be passed about the conduit and the front surface of the web,
  (iv) a crimping edge on the end of the web remote from said one end of the web, whereby after the strap is passed about the conduit and the front surface of the web, said strap may be bent upon itself and about the crimping edge to loosely connect the fastening device to the conduit, and
 (b) means for penetrating the webs and straps of two said fastening devices arranged about respective conduits and in juxtaposition to each other with the rear surfaces of their respective webs facing each other and with the free ends of the straps therebetween.

17. Means for supporting a variety of sizes and shapes of conduits and the like, comprising:
 (a) a rigid base member including,
  (i) an apertured web portion with first and second ends and a rear surface and a front surface,
  (ii) a pair of support flanges extending in parallel relation to each other from the front surface of the web adjacent its first end and joined to opposite edges of the web by shoulders which project beyond the rear surface of the web, the shoulders being deeper at the first end of the web than at its second end,
 (b) a flexible strap formed from crease-retaining material and having a fixed end and a free end,
 (c) means securing the fixed end of the strap to said rear surface of the web with the strap extending beyond said end of the web,
 (d) said strap having a longitudinal slot extending from adjacent its free end toward the fixed end and adapted to overlie an aperture in said apertured web, and
 (e) said strap being of sufficient length to extend about a conduit carried by the support flanges adjacent the first end of the web, across the front surface of the web between the support flanges and toward the second end of the web, about the second end of the web and along the rear surface of the web toward its said first end and between the shoulders with the free end of the strap overlying its said fixed end and lying in the same plane as the rearmost extremities of said shoulders, and (f) means between the first and second ends of the web for drawing that portion of the strap overlying the front surface of the web toward the web and toward a plane parallel to the web to tighten the strap about the conduit.

18. A fastening device according to claim 1 which includes spacing means engageable with the base whereby the conduit may be supported in spaced relation to a supporting surface.

19. A fastening device according to claim 1 wherein the support flanges include upper edges which are curvilinear and adapted to generally conform to the curvature of a conduit.

References Cited by the Examiner
UNITED STATES PATENTS

| 2,339,093 | 1/1944 | Metheny | 248—74 |
| 2,340,560 | 2/1944 | Rempt | 248—74 X |
| 2,345,279 | 3/1944 | Morehouse | 248—68 |
| 3,087,700 | 4/1963 | Carpenter et al. | 248—74 |

FOREIGN PATENTS 587,083  10/1933  Germany.

References Cited by the Applicant
UNITED STATES PATENTS

| 907,542 | 12/1908 | Vogel. |
| 2,426,708 | 9/1947 | Robertson et al. |
| 2,427,770 | 9/1947 | Ellinwood. |
| 3,099,054 | 7/1963 | Spiro. |

FOREIGN PATENTS

| 37,815 | 11/1930 | France. |
| 333,639 | 12/1958 | Switzerland. |

CLAUDE A. LE ROY, *Primary Examiner.*